United States Patent [19]
Skobel

[11] 3,965,931
[45] June 29, 1976

[54] BALANCED FLOW CROSS-HEAD

[76] Inventor: Max Skobel, 10 Lynnwood Road, Edison, N.J. 08817

[22] Filed: Aug. 18, 1975

[21] Appl. No.: 605,637

[52] U.S. Cl. .................... 137/561 A; 425/376; 264/176 R
[51] Int. Cl.² ........................................ B29F 3/02
[58] Field of Search ................... 137/561 A, 599; 425/113, 376; 264/176 R, 174

[56] References Cited
UNITED STATES PATENTS

| | | | |
|---|---|---|---|
| 299,920 | 6/1884 | Eyre | 137/561 A |
| 3,640,308 | 2/1972 | Bydal | 137/561 A |
| 3,825,645 | 7/1974 | Fayet | 425/376 X |
| 3,860,686 | 1/1975 | Myers | 425/113 X |

Primary Examiner—William R. Cline
Attorney, Agent, or Firm—Howard W. Hermann

[57] ABSTRACT

This application describes a cross-head for directing flowable polymeric materials 90° from the axis of an extruder or similar pressure source and providing substantially uniform pressure patterns at the cross-head output. This is accomplished by dividing and subdividing the stream entering the cross-head, each subdivision taking place on an axis of pressure symmetry and each substream being twisted 90° before reaching its next point of subdivision. The subdivision and twists are accomplished by mounting twisted pieces of flat bar stock in the conduit carrying the stream or substream, each piece having its input end positioned on the axis of symmetry of the stream at the point of stream division.

5 Claims, 11 Drawing Figures

3,965,931

BALANCED FLOW CROSS-HEAD

BACKGROUND OF THE INVENTION

The present invention relates to cross-heads for extruders or similar pressure sources of flowable polymeric materials and more particularly to improvements in such cross-heads aimed at providing a balanced flow at the die through which the material is to be forced at the cross-head output.

While in some applications it is possible to provide extruders and the like with dies which lie axially to the extruder it is often more efficient to provide the extruder with a cross-head so that extrusion through the firming die takes place at right angles to the extruder. A difficulty encountered, however, in using a cross-head is the fact that in bending the stream of material unequal pressures are introduced in the stream cross-section resulting in unequal amounts of material being forced through different portions of the die. This causes distortion of the part being shaped unless the die is designed unsymmetrically to exactly compensate for the distorted pressure pattern, a very difficult achievement.

Ideally the material leaving the output end of the cross-head and reaching the die would have uniform pressure distribution and would thereby eliminate the problem. The very viscous nature of the material normally used in extrusion processes would require a very long reach of laminar flow before pressure equilibrium could occur. While less viscous materials would allow pressure equilibrium to be achieved in a shorter distance such less viscous materials tend to sag upon leaving the die, creating yet another type of distortion.

SUMMARY OF PRESENT INVENTION

The present invention has for its primary object the provision of a cross-head which provides balanced flow at its output. By providing balanced flow it provides equal pressure distribution and will pass through a symmetrically placed die without distorting the extrusion emanating therefrom.

This is accomplished by multiple divisions of the stream in the cross-head, each division and subdivision taking place on the axis of pressure symmetry of the stream at the point of division. In its broadest sense the present invention includes attachment means for attaching the cross-head to a suitable source, such as a ram extruder, of the flowable polymeric material to be shaped, at least one conduit for accepting the stream of flowable material from the extruder and turning the direction of flow ninety degrees with respect to the direction of the stream as it entered the cross-head, a first flow dividing means dividing the stream along its axis of pressure symmetry into two equal substreams which each undergo a ninety degree twist as they are simultaneously spread so that each stream can again be subdivided by a second flow dividing means of the same type as the first. Each of the second flow dividing means is also positioned on the axis of symmetry of each of the substreams and the divided substreams are twisted ninety degrees again. The divided substreams then flow through a cross-head output plate designed to spread the substreams into a recombined single stream exteriorly thereof and inside a desired die attached to the cross-head. At this point all uneven pressure distribution caused by the ninety degree change of direction of stream flow from the source has been effectively dissipated.

BRIEF DESCRIPTION OF THE DRAWINGS

Other objects and attendant advantages of the invention will become apparent to those skilled in the art from a consideration of the following detailed description when read in connection with the accompanying drawings wherein.

DESCRIPTION OF PREFERRED EMBODIMENTS

Figure 1:
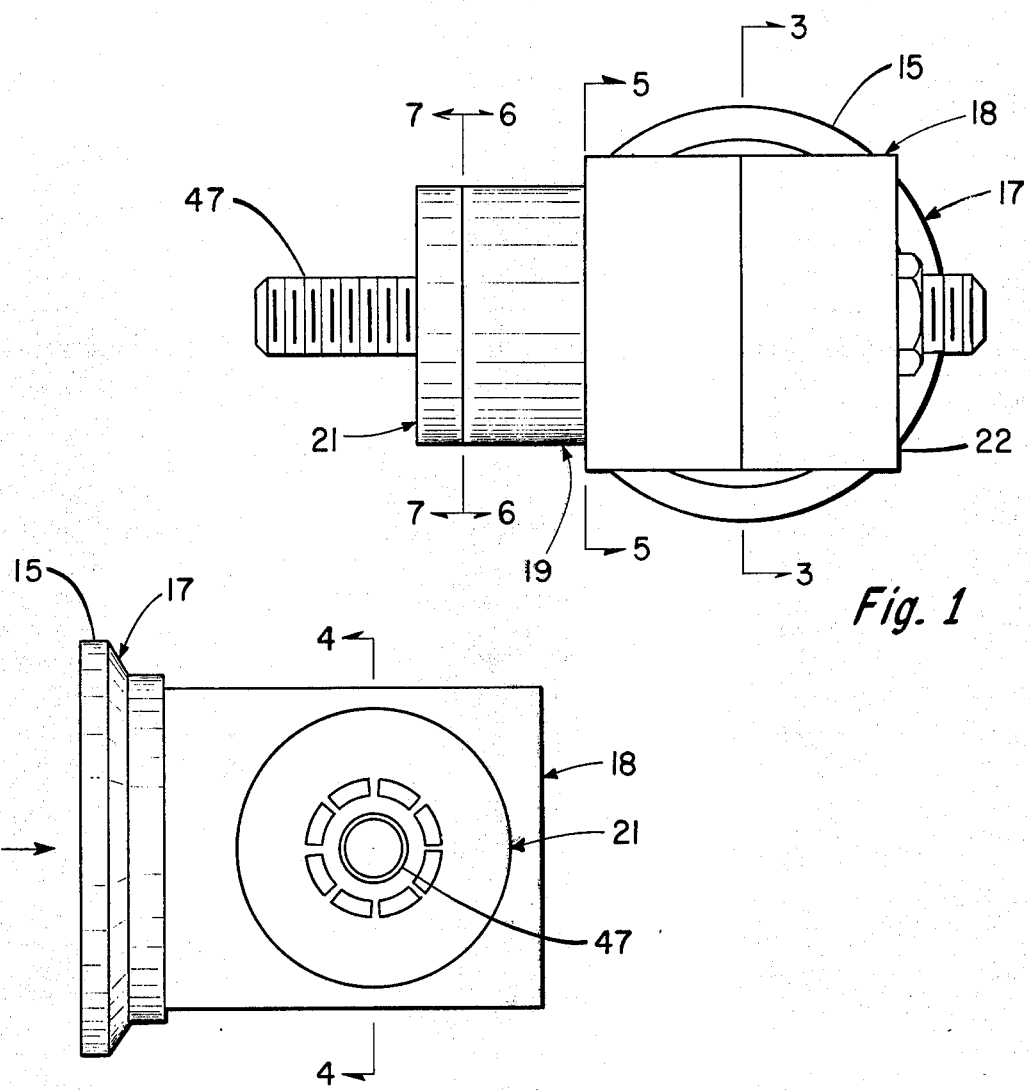
FIG. 1 is a front elevational view of a cross-head illustrating an embodiment of the invention.
Figure 2:
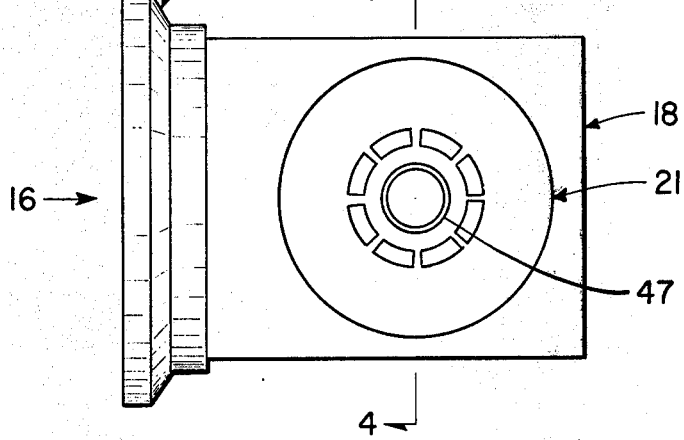
FIG. 2 is a side elevational view of the embodiment shown in FIG. 1.
Figure 3:
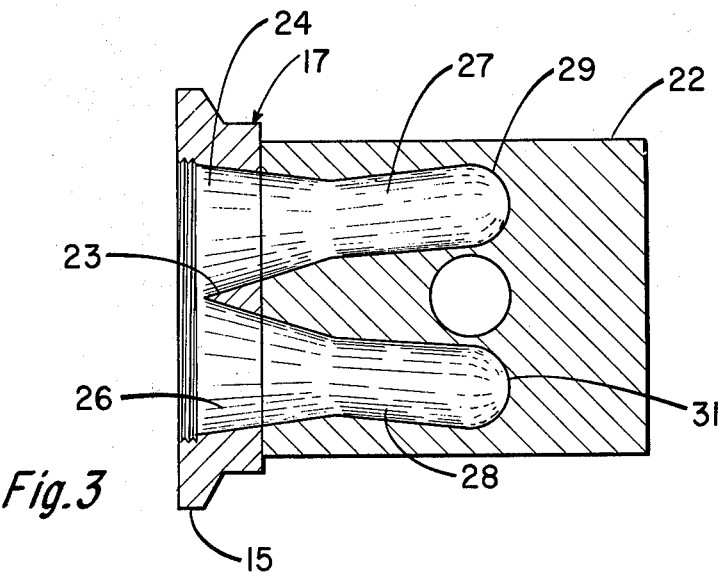
FIG. 3 is a vertical cross-sectional view of the embodiment shown in FIGS. 1 and 2 taken on the plane 3—3 of FIG. 1 and looking in the direction of the arrows.

Referring now to the drawings, wherein like reference characters designate like or corresponding parts throughout the figures thereof, there is shown in FIGS. 1 and 2 a cross-head according to the present invention having a connector ring 15 for attaching the device to the output of a suitable pressure source of the material to be extruded, which may be, for example, a ram extruder. The specific type of source is not critical to the invention and is illustrated merely by the input arrow 16 in FIG. 2. The cross-head may be connected to the source by any suitable means such as by means of threads which can be seen in FIG. 3.

As described herein the preferred embodiment is comprised of four elements shown generally as 17, 18, 19 and 21 on FIG. 1. The first element 17 includes the connector ring 15 and has affixed thereto a block 22 which has one surface aligned with the axis of the ring 15, and the material input 16, and bisecting the ring and material input stream as may be seen most clearly from FIGS. 1 and 3. A stream divider 23 comprising the intersecting point between a pair of tapered holes 24, 26 bored through the ring equidistant from its axis divides the input flow into two equal streams. A pair of semicylindrical grooves 27, 28 in the surface of the block 22 are aligned with the tapered holes 24 and 26, respectively. At the outermost end of each groove the groove ends in a radius equal to the radius of the groove as can be seen on FIG. 3 at 29 and 31, respectively so that the flow direction of each stream is turned 90° by the radius 29 and radius 31, respectively.

Figure 4:
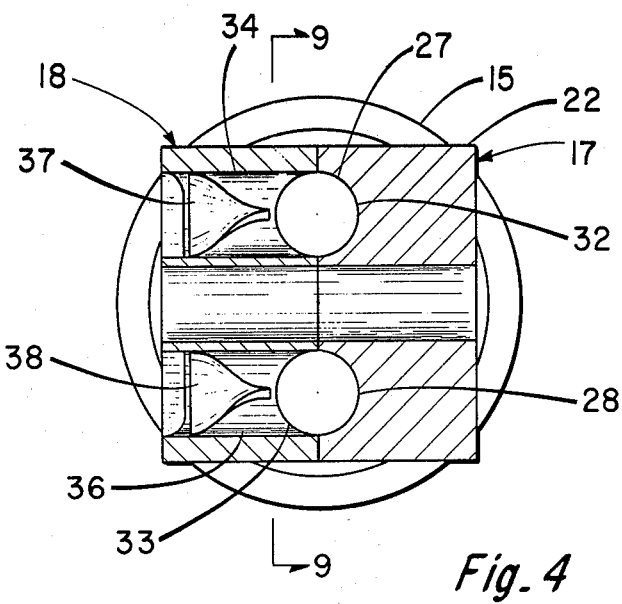
FIG. 4 is a vertical cross-sectional view of the first two elements of the embodiment shown in the previous figures and taken on the plane 4—4 of FIG. 2.

As may be seen from FIGS. 1 and 4 the element 18 as shown consists of a rectangular block having milled in one surface a pair of semicylindrical grooves 32 and 33 each having the same diameter and length as the grooves 27 and 28, respectively, of element 17 and forming therewith a pair of cylindrical channels for the two streams up to the point at which the streams are bent 90° toward element 18 by the radii 29 and 31. At this point there are provided a pair of bores 34 and 36 which each have a diameter at their points of intersection with the grooves which is equal to the groove diameter but which are at right angles to the grooves. The bores 34 and 36 thus provide conduits for the two streams which have been turned by the radii 29 and 31 in the ends of the grooves 27 and 28 of block 22 of element 17.

Figure 4A:
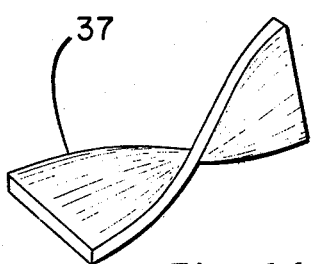
FIG. 4A is a perspective view of one of the stream dividers and twist elements shown in FIG. 4.
Figure 5:
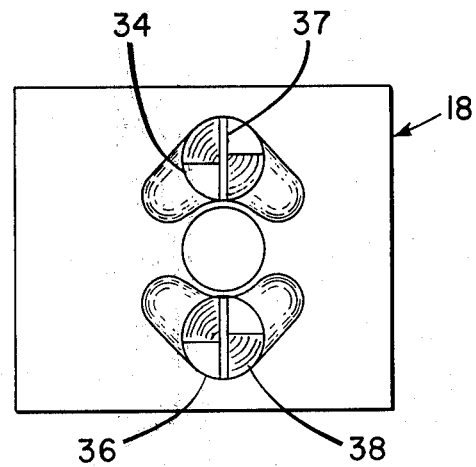
FIG. 5 is an end elevational view of the left-hand element of FIG. 4 as shown at the plane 5—5 of FIG. 1.

Mounted within each of the conduits 34 and 36 is a stream divider and rotating element 37 and 38, respectively. One of the elements 37 has been shown in greater detail in FIG. 4A. The stream divider and rotating element in each conduit has its leading edge positioned in the plane of symmetry of pressures of the flow of material in the stream so that each of the streams is equally divided insofar as volume of material passing into the divided stream is concerned. The elements 37 and 38 preferably consist simply of a length of flat bar stock having a 90° twist in it from one end to the other so that the axis of symmetry in each of the substreams is rotated ninety degrees as the material passes these elements. As may be seen from FIG. 5 the bores 37 and 38 are what may be termed kidney-shaped at the output side of the element 18 to provide a pair of diverging substreams displaced in axial alignment from the streams entering each of the bores.

Figure 6:
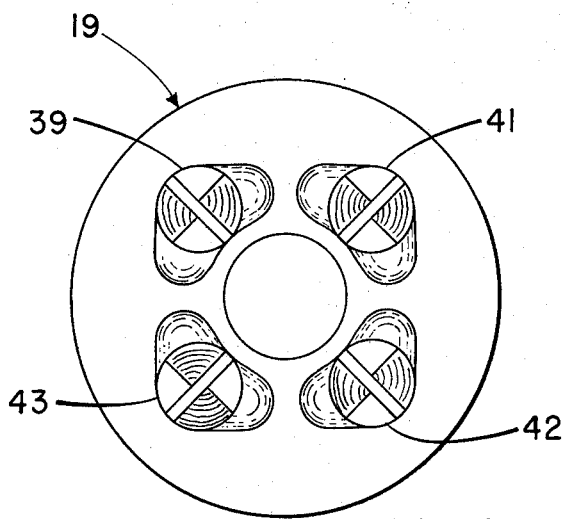
FIG. 6 is an end elevational view of the third element of the embodiment as shown by the plane and arrows 6—6 of FIG. 1.
Figure 7:
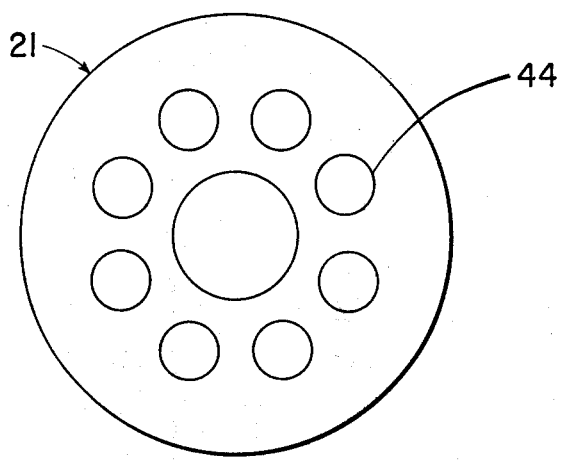
FIG. 7 is an end elevational view of the input end of the cross-head output plate as shown by the plane and arrows 7—7 of FIG. 1.

Referring now to FIGS. 1 and 6 the element 19 as illustrated has four equally circumferentially spaced bores 39, 41, 42 and 43 each of which is shaped substantially the same as the bores 34 and 36 of element 18 and each of which has another stream dividing and rotating element identical in shape to the elements 37 and 38 of element 18. The input ends of the bores 39, 41, 42 and 43 are preferably circular and correspond to the diameters of the ends of the kidney-shaped output configurations of the conduits of element 18; that is, bore 39 receives the substream of material passing through the left half of bore 34 of FIG. 5, bore 41 the right half and so forth. Each of the substreams entering each of the bores 39, 41, 42 and 43 of element 19 is again subdivided and rotated 90°, and the subdivided substreams and again allowed to become circumferentially displaced by the generally kidney-shaped output portions of the bores.

Figure 8:
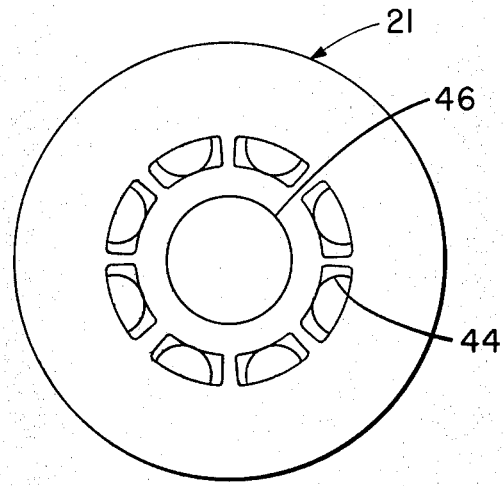
FIG. 8 is a plan view of the output end of the output plate shown in FIG. 7.

Attached to the output element 19 is output plate 21 which may be seen from FIGS. 1, 2, 7 and 8. Output plate 21 is provided at its input end with eight equally circumferentially spaced conduits as may be seen in FIG. 7. Each conduit 44 corresponds in location with one leg of one of the kidney-shaped output portions of one of the bores 39, 41, 42 or 43 of element 19 and receives the subdivided substream which emanates from that portion of element 19. The conduits as may be seen from FIG. 8 are preferably round at their input ends and taper to circumferentially closely spaced slots at their output ends.

The elements 17, 18, 19 and 21 are held together by suitable means such as an axial hole 46 bored through all of the elements whereby a bolt 47 (FIG. 1) may be passed through them to hold them in alignment. The bolt 47 may also be used to attach the desired die to the output end of the device. Alternatively, any other suitable means such as clamps or a series of bolts and brackets can be used.

Figure 9:
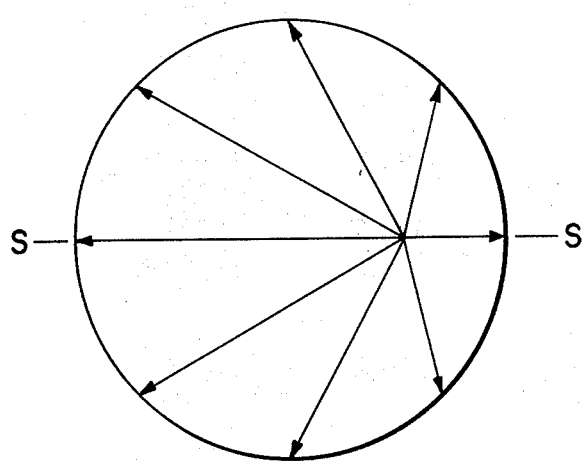
FIG. 9 is a force diagram illustrating inequality of the pressures appearing in the streams at plane 9—9 of FIG. 4.

The operation of the cross-head may be more clearly understood by reference to FIG. 9 which is a diagram of a typical pressure distribution occuring at plane 9—9 of FIG. 4 in each of the conduits 34 and 36 as flowable polymeric material under pressure is passing through the device. Assuming symmetrical pressure flow of relatively viscous material entering the device as shown at arrow 16 of FIG. 2 the 90° bend in stream direction at radius 29 or radius 31 results in upset of equilibrium and nonuniform pressures which is illustrated by the lengths of the arrows in FIG. 9. The vector sums of the pressures, however, are symmetrical about the axis S—S which in the device as illustrated is the horizontal axis. Thus, the division of each of the streams at this point creates equal substreams insofar as relative volume passing any given point per unit of time is concerned.

Figure 10:
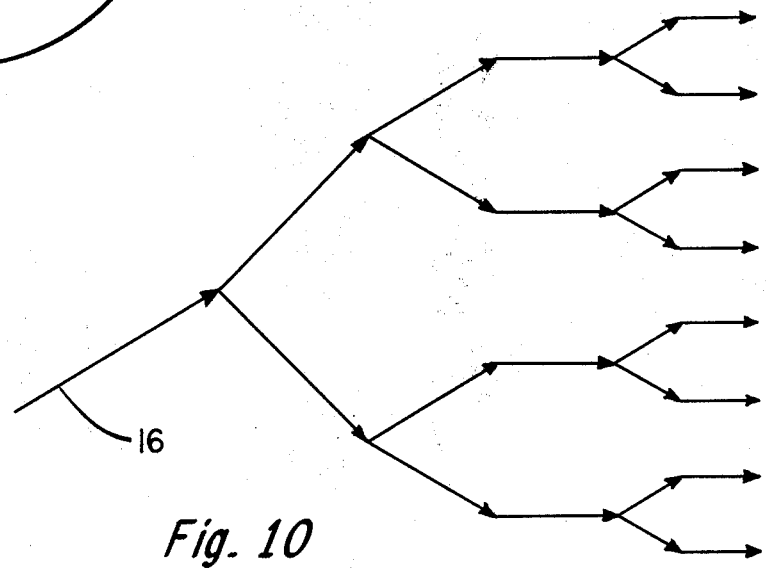
FIG. 10 is a two-dimensional diagram illustrating flow divisions in the device shown in FIGS. 1–9.

The twisting of the stream and resultant rotation of the axis of symmetry and further subdividing and twisting and circumferential spreading of the substreams results at the output after the series of divisions illustrated by FIG. 10 in a completely symmetrical cylindrical flow moving at ninety degrees to the axis of the extruder. The device utilizes a minimum of space, wastes a minimum of material, is relatively simple to manufacture and to clean and provides distortion free extrusions at its output.

Obviously, many variations and modifications of the device described will occur to those skilled in the art from a reading of the foregoing. It is to be understood that the above description represents only a presently preferred embodiment of the invention and that within the scope of the appended claims the invention may be practiced otherwise than as specifically described.

What is claimed is:

1. A balanced flow cross-head for extrusion of flowable materials comprising:
   attachment means for attaching the cross-head to a suitable source of a pressurized stream of such flowable materials,
   conduit means for accepting the stream of flowable material and turning the direction of flow away from the axis of the stream emanating from said source,
   first flow dividing means in fluid communication with said conduit means for dividing said stream by a plane defined by the axis of symmetry of pressures in the conduit and the axis of stream flow as it emerges from said conduit means after being turned, and for twisting each substream 90°,
   second flow dividing means in fluid communication with the output of a first flow dividing means for subdividing each of the substreams emanating from the first flow dividing means said second flow dividing means positioned on the axis of symmetry of the substreams and including means for twisting the axis of symmetry of each portion of each of the substreams 90°, and
   a cross-head output plate having a plurality of fluid paths communicating with said subdivided substreams for spreading the subdivided substreams into a recombined single stream exteriorly thereto.

2. A balanced cross-head as defined in claim 1 wherein each of said first and second flow dividing means comprises a tubular conduit having affixed therein a rigid flat bar having a 90° twist therein.

3. A balanced cross-head as defined in claim 1 wherein said conduit means includes a separator and a pair of conduits for separating the stream into two components at its point of entry into the cross-head and wherein each of the first and second flow dividing means includes duplicate means arranged in mirror image to each other, each in fluid communication with the flow of material through one conduit of said pair.

4. A balanced cross-head as defined in claim 3 wherein said cross-head output plate has its outlet ports arranged in a circular pattern, each outlet port ejecting one of the subdivided substreams.

5. A balanced cross-head as defined in claim 4 wherein said cross-head output plate contains eight equally spaced outlet ports.

* * * * *